United States Patent [19]

Glennon

[11] Patent Number: 4,519,022
[45] Date of Patent: May 21, 1985

[54] RIPPLE REDUCTION CIRCUIT FOR AN INVERTER

[75] Inventor: Timothy F. Glennon, Rockford, Ill.

[73] Assignee: Sundstrand Corporation, Rockford, Ill.

[21] Appl. No.: 554,250

[22] Filed: Nov. 22, 1983

[51] Int. Cl.³ .............................................. H02M 1/14
[52] U.S. Cl. ...................................... 363/41; 363/75; 363/132
[58] Field of Search .................. 363/40, 41, 45, 46, 363/48, 75, 82, 98, 126, 131, 132

[56] References Cited

U.S. PATENT DOCUMENTS

| | | |
|---|---|---|
| 1,965,661 | 7/1934 | Loftis . |
| 2,630,557 | 3/1953 | Bixby . |
| 3,340,458 | 9/1967 | Keller ................ 363/48 |
| 3,510,753 | 5/1970 | Lawn ................. 363/46 |
| 3,551,780 | 12/1970 | Gautherin . |
| 3,761,797 | 9/1973 | Spooner . |
| 3,777,248 | 12/1973 | Vermolen .............. 363/45 |
| 3,825,814 | 7/1974 | Pelly ................. 363/41 |

Primary Examiner—Peter S. Wong
Assistant Examiner—Anita M. Ault
Attorney, Agent, or Firm—Wood, Dalton, Phillips, Mason, & Rowe

[57] ABSTRACT

A ripple reduction circuit for an inverter which converts DC power supplied on DC buses into AC power to drive a load includes a sensing transformer having a primary winding coupled to one of the buses by a switch so that the ripple on the DC bus is sensed. A periodic voltage is impressed across a secondary winding of the sensing transformer due to the sensed ripple and this periodic waveform is coupled to a secondary winding of an output inductor. A primary winding of the output inductor is connected between the output of the inverter and the load. The primary winding of the output inductor receives a first ripple component due to ripple on the DC bus and a second ripple component which opposes the first as a result of the periodic waveform in the secondary winding of the output inductor. The two ripple components substantially cancel one another and hence a low distortion power waveform is delivered to the load.

9 Claims, 3 Drawing Figures

RIPPLE REDUCTION CIRCUIT FOR AN INVERTER

DESCRIPTION

1. Technical Field

The present invention relates generally to inverters, and more particularly to an inverter having a circuit for reducing distortion in the output of the inverter.

2. Background Art

In an inverter system for converting DC power into polyphase AC power to drive a load, the DC power on a DC bus is often obtained by rectifying the output of an alternating current source. Often, this rectification of the AC source output causes a ripple component to be superimposed on the DC level. Additional ripple may be introduced on the DC bus due to an unbalanced load connected to the polyphase output of the inverter. The unbalanced load typically causes generation of a third harmonic ripple which combines with the rectification ripple described above. This combined ripple causes increased harmonic distortion in the AC power output of the inverter. Usually, this problem is solved to a certain extent by an increase in output filter or DC bus filter size. This however, undesirably increases the size and weight of the overall system.

Various other attempts have been made to reduce rectification ripple. One attempt is disclosed in Spooner U.S. Pat. No. 3,761,797. This patent discloses an electrical filter wherein ripple on a DC bus is sensed and combined in a choke with DC bus current to substantially reduce the ripple. The filter includes a capacitor and resistor connected across the output terminals of the filter, with the capacitor blocking the DC component of the bus current to allow the ripple component to pass to an amplifier. The amplifier output is in turn connected to the choke in a manner such that the ripple from the amplifier opposes the ripple on the DC bus.

The Spooner circuit, however, is utilized only in an AC to DC converter, and hence is not concerned even remotely with the problem of ripple on a DC bus caused by an unbalanced load at the output of an inverter coupled to such bus.

DISCLOSURE OF INVENTION

In accordance with the present invention, an inverter for converting DC power on a DC bus into AC power to drive a load includes ripple reduction circuitry to reduce ripple in the AC power output.

The ripple reduction circuitry includes an output inductor having primary and secondary windings, the primary winding being connected between an output of the inverter and the load and receiving a first ripple component caused by ripple on the DC bus. A sensing transformer having primary and secondary windings is connected by means of a auxiliary switch to the DC bus so that the ripple on the DC bus is sensed and a periodic waveform is impressed across the secondary winding of the sensing transformer. The secondary winding of the sensing transformer is coupled to the secondary winding of the output inductor so that the periodic waveform induces a second ripple component in the output inductor primary winding in opposition to the first ripple component to substantially reduce the ripple supplied to the load.

BEST MODE FOR CARRYING OUT THE INVENTION

Figure 1:
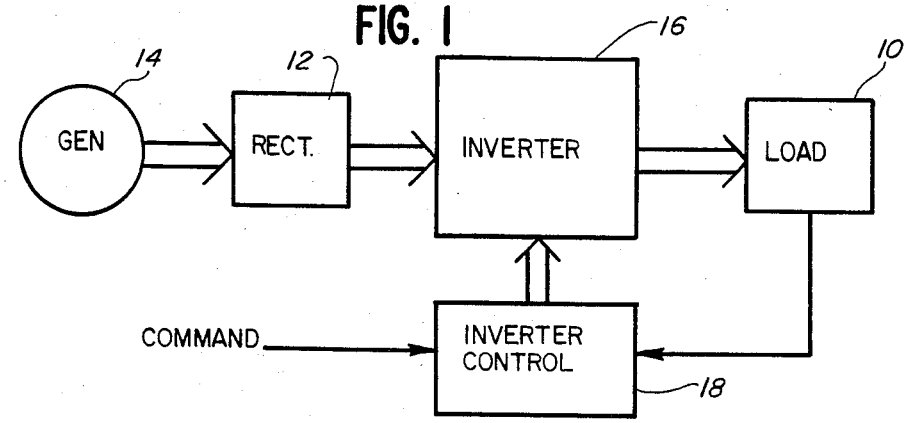
FIG. 1 is a block diagram of an inverter power supply system incorporating the ripple reduction circuitry of the present invention.

Referring now to FIG. 1, there is illustrated an inverter power supply system for converting DC power into AC power to drive a load 10. The DC source includes a rectifier circuit 12 which converts AC power supplied by an AC source, such as a generator 14, into DC power. The DC power is converted back to constant frequency AC power by an inverter 16, with the inverter 16 being controlled by an inverter control circuit 18. The inverter control circuit receives information regarding conditions at the output of the inverter 16 or in the load 10, with the type of information being dependent upon the nature of the load. For example, if the load is an AC motor, rotor position may be sensed in the inverter control and the switches controlled in dependence upon the sensed position. Moreover, the inverter control circuit 18 may operate in response to a command signal. In the present example where the load is a motor, this command signal may represent desired motor speed.

The inverter control circuit 18 may be of the type which is commonly referred to as a pulse width modulation control which provides time ratio control of switches in the inverter 16. Another type of control circuit may be utilized if desired.

The DC power supplied to the inverter 16 often contains an AC ripple component superimposed on the DC level caused by an unbalanced load connected to the output of the inverter and by imperfect filtering in the rectifier 12. Typically, for a three-phase inverter, a third order harmonic is introduced in the output power waveform by the unbalanced load condition, as illustrated by the waveform V$_2$ in FIG. 3.

Conventionally, the ripple on the DC bus is reduced by increasing the size of the DC bus filter, thereby resulting in a substantial increase in the overall system size and weight.

The present invention eliminates the necessity for an increase in DC bus filter size by sensing the ripple component and summing the component in an output inductor in the inverter 16 to substantially cancel the ripple delivered to the load 10.

Figure 2:
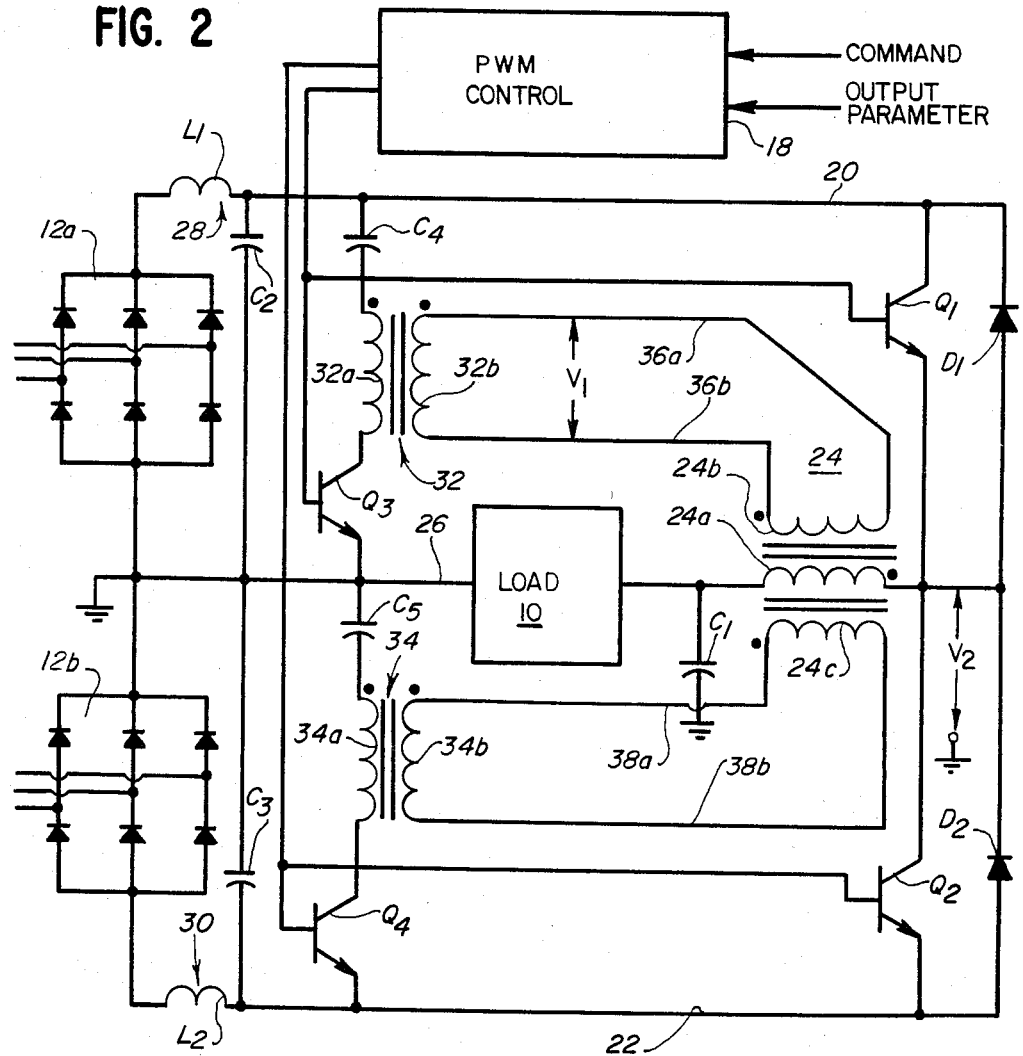
FIG. 2 is a schematic diagram of the rectifier, inverter and inverter control shown in FIG. 1.

Referring now to FIG. 2, there is shown in greater detail one example of an inverter 16 which may be utilized with the ripple reduction circuitry of the present invention. Only one phase of the inverter 16 is specifically illustrated in FIG. 2, it being understood that the load 10 receives additional phase outputs, each of the phases being identical to that shown. The inverter 16 converts DC power from a double-ended DC source having positive and negative voltage levels and a neutral or ground into polyphase AC power. It should be noted that the present invention may be utilized in conjunction with an inverter which converter power from a single-ended DC source, if desired.

The inverter includes first and second power switches Q1 and Q2 which are connected across power buses 20 and 22. Free wheeling diodes D1 and D2 are connected across the collector-emitter circuits of the switches Q1 and Q2 as is conventional.

DC power is provided by a pair of rectifier bridges 12a and 12b which together comprise the rectifier circuit 12. The rectifier bridges 12a,12b receive polyphase inputs from the generator 14 and convert this AC power into positive and negative DC voltages which are coupled to the power buses 20,22.

A primary winding 24a of an output inductor 24 and the load 10 are serially connected between a junction between the switches Q1 and Q2 and a ground bus 26. A filter capacitor C1 is connected between the load 10 and ground potential.

Figure 3:
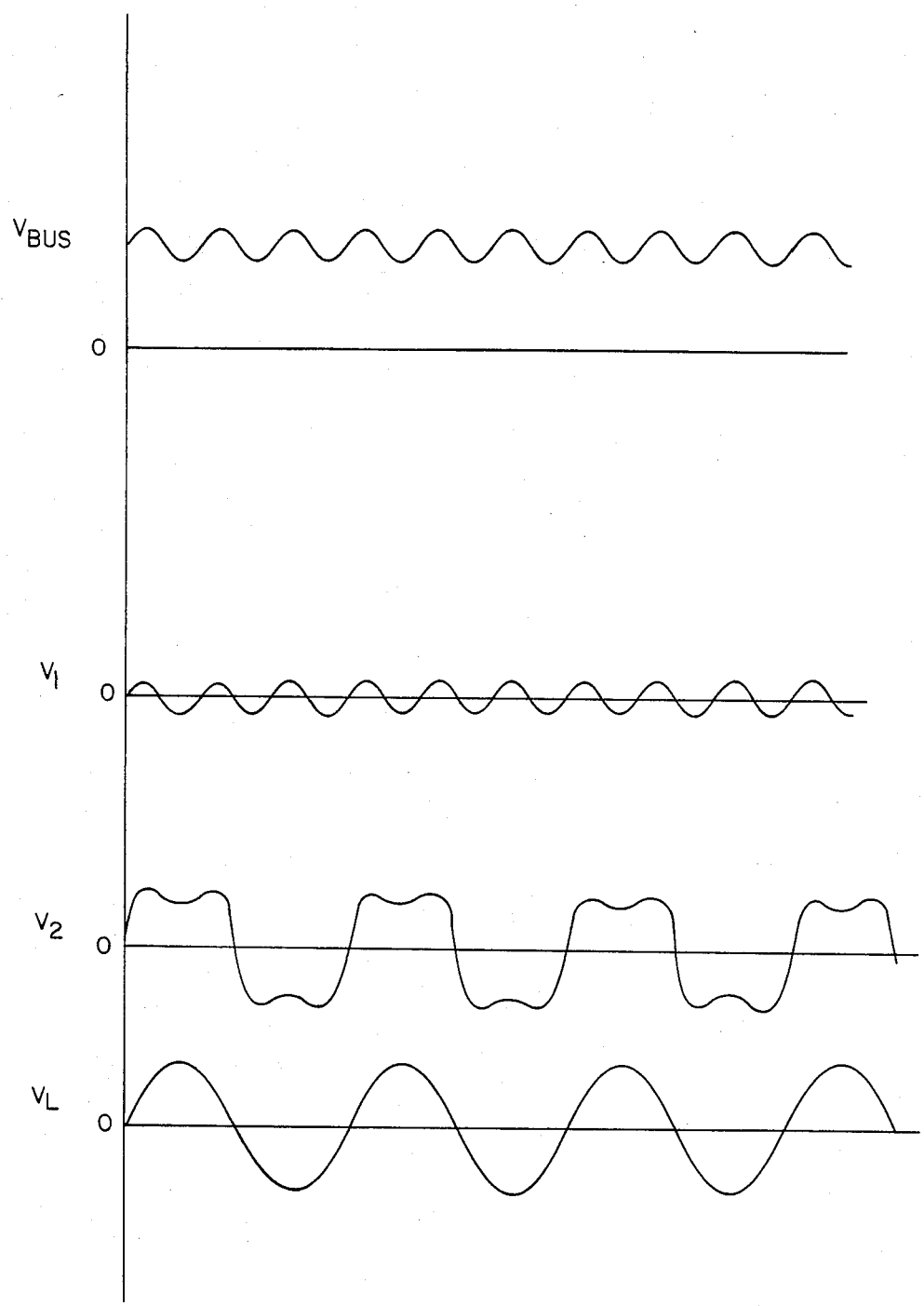
FIG. 3 is a series of waveform diagrams illustrating the operation of the circuit shown in FIG. 2.

The switches Q1 and Q2 are operated by the PWM control 18 to alternately connect the junction between the two transistors to the power buses 20,22, and hence apply positive and negative voltages to the load 10. As seen in FIG. 3 in the graph marked $V_{BUS}$, often the DC power on the power buses 20,22 includes substantial ripple which causes a first ripple component to appear across the primary winding 24a of the output inductor 24. DC bus filters 28,30 are utilized to attenuate some of the ripple which is present at the output of the rectifiers 12a,12b. The filters 28,30 include inductors L1,L2 and capacitors C2,C3.

Serially connected between the power bus 20 and the ground bus 26 is a primary winding 32a of a sensing transformer 32, an auxiliary switch Q3 and a DC blocking capacitor C4. Similarly, a primary winding 34a of a sensing transformer 34, an auxiliary switch Q4 and a DC blocking capcitor C5 are connected in series between the power bus 22 and the ground bus 26. The switches Q1–Q4 in the preferred embodiment are bipolar transistors, although other types of switching devices may be used, if desired.

The auxiliary switches Q3 and Q4 are operated by the PWM control 18 in synchronism with the transistors Q1 and Q2, respectively, so that the primary windings alternately sense the ripple on the power buses 20,22.

Each of the sensing transformers 32,34 includes secondary windings 32b,34b, respectively. The secondary windings 32b,34b are coupled to first and second secondary windings 24b,24c, respectively, of the output inductor 24. The secondary windings 24b,24c are wound in opposition to the primary winding 24a, as noted by the polarity dots in the figure.

When the transistor Q1 is operated by the PWM control 18, the transistor Q3 is also operated, thereby permitting current to flow in the primary winding 32a of the sensing transformer 32. The ripple on the DC bus 20 is sensed and causes a periodic voltage to appear across the primary winding 32a, with the DC level on the power bus 20 being blocked by the capacitor C4. A corresponding periodic waveform is impressed across the secondary winding 32b of the sensing transformer 32 and is coupled by means of conductors 36a,36b to the secondary winding 24b of the output inductor 24.

The voltage across the secondary winding 24b causes a second ripple component to be impressed across the primary winding 24a of the output inductor which opposes the first ripple component caused by the ripple on the power bus 20. The two ripple voltages in the primary winding 24a substantially cancel each other out, and hence harmonic distortion in the output voltage $V_L$ is significantly reduced.

The operation of the sensing transformer 34, the capacitor C5 and the transistor Q4 is substantially identical to that described above. Briefly, when the transistor Q2 is turned on by the PWM control 18, the transistor Q4 is also turned on, thereby causing a periodic waveform to be induced in each of the windings 34a, 34b. The periodic waveform is coupled to the secondary winding 24c over conductors 38a,38b to induce a ripple component in the primary winding 24a which opposes the ripple component therein caused by ripple on the power bus 22.

In some instances, it may be necessary to include phase shifting circuitry between the windings 32b, 24b and 34b,24c, respectively. In the event this is necessary, the phase shifting network can be a simple LC circuit to provide the proper time delay to effect maximum cancellation of ripple in the power supplied to the load 10.

By utilizing the ripple reduction circuitry of the present invention, the filters 28,30, and the output filter formed by inductor 24 and capacitor C1 need not be very large, and hence the size and weight of the resulting inverter can be held to a minimum.

It should be noted that the present invention is not limited to the inverter topology illustrated but can be adapted for use in various other inverter topologies.

I claim:

1. In an inverter for converting DC power supplied on a pair of buses into AC power to drive a load, the inverter having a power switch coupled between a bus and the load with the load being in turn coupled to the other bus, the power switch being operated to develop the AC power, an improved ripple reduction circuit for reducing ripple in the AC power caused by ripple on the buses, comprising:

a sensing transformer coupled between the buses having a primary winding which senses the ripple on the bus and a secondary winding which develops a periodic waveform in response to the sensed ripple; and an output inductor having a secondary winding coupled to the sensing transformer secondary winding and a primary winding coupled between the power switch and the load, the primary winding receiving a first ripple component due to ripple in the bus, the periodic waveform in the output inductor secondary winding inducing a second ripple component in the output inductor primary winding which opposes the first ripple component to reduce ripple delivered to the load.

2. The ripple reduction circuit of claim 1, further including an auxiliary switch which is operated with the power switch to connect the sensing transformer to the buses.

3. The ripple reduction circuit of claim 1, further including a blocking capacitor coupled in series with the sensing transformer primary winding to block a DC component on the bus.

4. In an inverter for converting DC power supplied on a pair of buses into AC power to drive a load, the inverter having a power switch coupled between one of the buses and the load which is in turn connected to the other bus, the power switch being operated by an inverter control to develop the AC power, an improved circuit for reducing ripple in the AC power caused by ripple on the buses, comprising:

an output inductor having primary and secondary windings, the primary winding being connected between the power switch and the load and receiving a first ripple component caused by the ripple on the buses;

a sensing transformer having primary and secondary windings;

an auxiliary switch for connecting the sensing transformer primary winding across the DC buses when the power switch is operated so that the ripple on the buses is sensed and a periodic waveform is developed in the secondary winding of the sensing transformer as a result; and means for coupling the secondary winding of the sensing transformer to the secondary winding of the output inductor so that the periodic waveform induces a second ripple component in the output inductor primary winding so as to substantially reduce the ripple supplied to the load.

5. The improved circuit of claim 4, further including a blocking capacitor coupled in series with the sensing transformer primary winding and the second switch to block a DC component on the bus.

6. The improved circuit of claim 4, wherein the secondary winding of the output inductor is wound in opposition to the primary winding thereof so that the first ripple component in the primary winding is opposed by the second ripple component.

7. In an inverter for converting DC power supplied on first and second power buses and a ground bus into AC power to drive a load, the inverter having first and second power switches connected across the first and second power buses which are alternately actuated to develop the AC power at a junction between the switches, the load being coupled between the junction and the ground bus, a ripple reduction circuit for reducing ripple in the AC power caused by ripple on the buses, comprising:

first and second sensing transformers coupled between the first bus and the ground bus and the second bus and the ground bus, respectively, each sensing transformer having a primary winding which senses the ripple on the bus and a secondary winding which develops a periodic waveform in response to the second ripple; and an output inductor having first and second secondary windings coupled to the first and second transformer windings, respectively, and a primary winding coupled between the junction and the load which receives a first ripple component due to ripple on the power buses, the periodic waveform in the output inductor secondary windings inducing further ripple components in the output inductor primary winding which oppose the first ripple component to reduce ripple delivered to the load.

8. The ripple reduction circuit of claim 7, further including first and second auxiliary switches which are operated with the first and second power switches, respectively, to alternately connect the first and second sensing transformers to the first and second buses, respectively.

9. The ripple reduction circuit of claim 7, further including first and second blocking capacitors between the first DC bus and the ground bus and the second DC bus and the ground bus, respectively, to prevent DC components on the power buses from reaching the sensing transformer.

* * * * *